(12) United States Patent  
Roderique

(10) Patent No.: US 7,099,680 B2  
(45) Date of Patent: Aug. 29, 2006

(54) DATA INTERFACE PROTOCOL FOR TWO-WAY RADIO COMMUNICATION SYSTEMS

(75) Inventor: William John Roderique, Lynchburg, VA (US)

(73) Assignee: M/A-COM Private Radio Systems, Inc., Lynchburg, VA (US)

( * ) Notice: Subject to any disclaimer, the term of this patent is extended or adjusted under 35 U.S.C. 154(b) by 443 days.

(21) Appl. No.: 10/137,958

(22) Filed: May 3, 2002

(65) Prior Publication Data

US 2003/0207693 A1 Nov. 6, 2003

(51) Int. Cl.
*H04B 7/00* (2006.01)

(52) U.S. Cl. .................. 455/509; 455/517; 455/518

(58) Field of Classification Search ............ 455/170.1, 455/160.1, 153.2, 9, 15, 33.1, 33.2, 33.3, 455/33.4; 370/58.1, 58.2, 58.3, 60, 99, 462, 370/461

See application file for complete search history.

(56) References Cited

U.S. PATENT DOCUMENTS

| | | | |
|---|---|---|---|
| 4,903,262 A | 2/1990 | Dissosway et al. | ........ 370/95.2 |
| 5,109,543 A | 4/1992 | Dissosway et al. | ...... 455/170.1 |
| 5,125,102 A | 6/1992 | Childress et al. | ............... 455/9 |
| 5,212,724 A * | 5/1993 | Nazarenko et al. | ......... 455/560 |
| 5,265,093 A | 11/1993 | Dissosway et al. | ...... 370/85.11 |
| 5,640,684 A * | 6/1997 | Konosu et al. | ............ 455/67.7 |
| 6,006,099 A | 12/1999 | Rondeau et al. | ............ 455/462 |
| 6,016,107 A * | 1/2000 | Kampe et al. | ............. 340/7.46 |
| 6,275,966 B1 * | 8/2001 | Sitterley | ..................... 714/782 |
| 6,317,595 B1 | 11/2001 | St. John et al. | ............. 455/417 |
| 2003/0086438 A1* | 5/2003 | Laumen et al. | ............. 370/462 |
| 2003/0190923 A1* | 10/2003 | Janky et al. | ................. 455/518 |

* cited by examiner

*Primary Examiner*—George Eng  
*Assistant Examiner*—Phuoc Doan

(57) ABSTRACT

A method and system is disclosed that allows for the designation of over 1,000,000 individual users in a communication system, such as an EDACS system, using the existing five-digit portion of command message utilized for specifying the destination address. This is accomplished by using an Extended Addressing Digital Interface (EADI) protocol using hexadecimal characters in the command message rather than decimal characters, thereby creating an "extended addressing" (EA) capability. The largest five-digit hexadecimal number, FFFFF, corresponds to the decimal number 1,048,575, thereby realizing the ability to exceed one million users, without having to change the size (number of digits) in the command message. Backward compatibility is assured by adding new mode commands that identify a particular command message as being generated by EA compatible equipment.

14 Claims, 4 Drawing Sheets

| m | c | 00 | t | ggggg | nnnn |
|---|---|----|---|-------|------|
| 1 | 0 | 00 | 2 | 16238 | 0032 | m = MODE
    m = 1 → Standard XFERB
    m = 2 → PROFILE (radio destined) message (XPROFILE)

c = ACK2
    c = 1 → ACK 2 sequence implemented
    c = 0 → Standard Sequence implemented t = CALL TYPE
    t = 2 → Individual Call
    t = 1 → Group Call ggggg = ID
    If t = 2 (Individual Call) and XFERB initiated by MDT/PC, then
    ggggg = Individual ID (LID) of unit being called;
    If t = 2 (Individual Call) and XFERB initiated by the RDI, then
    ggggg = Individual ID of the originating unit.

Valid LID's range from 00001 to 16382 decimal.

If t = 1 (Group Call), then
    ggggg = Data Group ID (GID) being called.

Valid GID's range from 00001 to 02047 decimal.

nnnn = Data Binary Bytes
    nnnn - number of binary bytes to transfer
    (0001 to 0512 decimal)

Figure 2

| m | c | 00 | t | ggggg | nnnn |
|---|---|----|---|-------|------|
| 3 | 0 | 00 | 2 | F112A | 0032 | m = MODE
    m = 1 → Standard XFERB
    m = 2 → PROFILE (radio destined) message (XPROFILE)
    m = 3 → *Standard Extended Address (EA) XFERB*
    m = 4 → *PROFILE EA message* c = ACK2
    c = 1 → ACK 2 sequence implemented
    c = 0 → Standard Sequence implemented t = CALL TYPE
    t = 2 → Individual Call
    t = 1 → Group Call ggggg = ID
    If t = 2 (Individual Call) and XFERB initiated by MDT/PC, then
    ggggg = Individual ID (LID) of unit being called;
    If t = 2 (Individual Call) and XFERB initiated by the RDI, then
    ggggg = Individual ID of the originating unit.

*If m = 1 or 2, then valid LID's range from 00001 to 16382 decimal;*
*If m = 3 or 4, then valid LID's range form 00001 to FFFFF hexadecimal.*

If t = 1 (Group Call), then
    ggggg = Data Group ID (GID) being called.

*If m = 1, then valid GID's range from 00001 to 02047 decimal;*
*If m = 3, then valid GID's range from 0001 to 0FFFF hexadecimal.* nnnn = Data Binary Bytes
    nnnn - number of binary bytes to transfer
    (0001 to 0512 decimal)

Figure 3

DATA INTERFACE PROTOCOL FOR TWO-WAY RADIO COMMUNICATION SYSTEMS

FIELD OF THE INVENTION

This invention is generally related to the field of two-way radio communications and, more particularly, relates to trunked two-way radio systems using digital control signals transmitted over a dedicated control channel.

BACKGROUND OF THE INVENTION

Two-way radio communication systems such as land mobile radio (LMR) have been in use for many years. With conventional LMR, users typically communicate with each other using hardware devices comprising at least one base station or dispatching unit and one or more transmitting/receiving (TR) devices, such as mobile radios (MR's). MR's typically comprise hand-held portables, vehicle-installed radios, and the like, and to communicate with each other, users of the system select a predetermined frequency over which to transmit and receive messages via the base station.

LMR's are frequently used by police and fire departments, rescue workers, paramedics, power and telephone company field technicians, municipalities, and other mobile groups that require immediate communication with other members of their respective groups. Communication between the various members can also include visual information, which may be displayed on another TR device called a mobile data terminal (MDT). MDT's include portable devices such as a laptop computer, a personal digital assistant (PDA), or other portable data device that is associated with an MR. For example, a police officer may request and receive information from a computer located at the police station about a stopped motorist, which is displayed on an MDT in the officer's patrol car via the officer's MR.

FIG. 1 illustrates a typical LMR environment. Referring to FIG. 1, individual units of various groups (e.g., emergency vehicles, fire vehicles, police vehicles, and handheld users) communicate with each other (both within and possibly outside of their own group) using MR's (e.g., a vehicle mounted MR 120 and a handheld MR 124 in FIG. 1) over shared radio channels coordinated by a central controller 100. If desired, MDT's can be paired with any of the MR's so that visual information can be transmitted and received over the LMR system. In FIG. 1, MR 120 is paired with MDT 122, and MR 124 is paired with MDT 126.

Central controller 100 can comprise a dispatch console housed directly at a base station or may be remotely located via other communication facilities (e.g., landline connections) as will be appreciated by those in the art. There may also be multiple dispatch consoles (e.g., one for each separate fleet) and a master or supervisory dispatch console for the entire system as will also be appreciated by those in the art. The details of the operation of such a system, as well as the hardware and/or software for building such a system are well known and are not discussed in detail herein.

In early systems, each channel was assigned a dedicated frequency. Thus, for example, all persons utilizing channel 10 in the system would transmit and receive messages on the same frequency. While this functioned adequately when a small number of users used the system, as the popularity of two-way radio systems grew, the pre-assigned channels became congested and difficult to use, and privacy was limited so that anyone could easily listen in on communications over the channels.

The spectral inefficiency of conventional two-way radio systems led to the development of "trunked" systems. Trunking is a method of using relatively few communication paths for a large number of potential users. Trunking systems allow for the automatic sharing of a "pool" of frequencies assignable to multiple radio channels among a group of users.

In a typical trunking system, each MR has a unique identifier ("logical ID" or "LID"), and multiple MR's may be designated as being part of a group (e.g., all firefighters) with a corresponding group identifier (group ID or GID). A user of an MR wishing to transmit a voice communication to another MR or group of MR's inputs a LID (for an individual MR) or a GID (for a group of MR's) for the target (i.e., receiving) radio(s), e.g., via a keypad on the MR or any other known means for inputting an ID. In a known manner, the central controller assigns a frequency from the frequency pool for the transmission, and when the transmission is complete, the frequency is "returned" to the pool.

A control frequency (also referred to as a "control channel") is allocated to send signals that coordinate the use of the MR's within the system. In FIG. 1, control channel 130 performs this function for MR 120, and control channel 136 performs this function for MR 124. The MR's constantly monitor the control channel for instructions from the central controller 100. When a voice call is initiated from a radio in the system (e.g., by pressing the "push-to-talk" (PTT) button on the MR) the LID's of the transmitting and target radios are transmitted on the control frequency to the central controller. The central controller uses the LID information to assign a voice "working" frequency (also called a "working channel") for the voice transmission between the transmitting and target radios. In FIG. 1, the working channel for a voice transmission from MR 120 to central controller is illustrated by transmit (TX) and receive (RX) lines 132. Likewise, the working channel for voice communications between MR 124 and central controller 100 is illustrated by TX and RX lines 138. The concept of trunking radio systems and their use of LID's and GID's is well known. The focus of the present application is on the manner in which the LID's and GID's are assigned, and in particular, how they are assigned in a well-known system called the Enhanced Digital Access Communications System (EDACS).

EDACS is a well known, extremely flexible trunked communication system designed to provide secure, reliable two-way radio communications for public safety, utility, government, military, and business and industrial organizations. EDACS allows the transmission and receiving of voice and data communications and allows users to make and receive telephone calls over the system via fixed handsets or cordless telephones. An interface between MR's in an EDACS system and their associated MDT's is necessary for flow control. Key to the operation of EDACS is the Radio Digital Interface (RDI) and the RDI protocol. The RDI protocol is a protocol that functions with the RDI (a known hardware device) to facilitate the flow of data between an MR and its associated MDT. The RDI protocol functions with RDI hardware to maximize data throughput in the EDACS system by handling all system acknowledgments and message retries necessary to ensure that data is transported correctly and without errors. Typically, the MDT uses a 9600 bps serial interface of the RDI hardware to connect to the MR. The MR's can contain an internal RDI or an external RDI. The RDI protocol is simply a flow control protocol and, as such, has no effect on the content of the message.

Under the RDI protocol, a request to send a block of data from the MDT to the MR, or vice versa, is referred to as an "XFERB command". The RDI-protocol-specific information is not transmitted over the RF interface (the RF coupling between the MR and the central controller), rather, the RDI protocol serves only to transfer the block of data and associated call information between the MR and the MDT. In an outgoing data transfer from an MDT to an MR, the LID sent via the RDI protocol identifies the target MR that will receive the data and transfer the data to its MDT. It is subsequently included by the transmitting MR, along with its own LID, in a call request over the control channel. The processor that manages the control channel (not shown) assigns a data working channel for the data transmission, and the block of data that was sent to the transmitting MR from the transmitting MDT, via the RDI protocol, is then sent over the data working channel to the central controller.

In FIG. 1, if we assume a data transmission from MDT 122 to MDT 126, the LID of receiving MDT 122 would be sent over the RDI interface to transmitting MR 120. Transmitting MR 120 would then add its own LID and transmit both LID's over the control channel 130 to central controller 100. Central controller 100 would then establish a data working channel, illustrated by TX and RX lines 134, over which MR 120 would send the data. In a similar (but reverse) manner, central controller 100 then sets up a data working channel 140 to receiving MR/MDT pair 124/125. When received by receiving MR 124, the LID of the transmitting MR 120 is also received as part of the transmission, so that the receiving MR/MDT pair 124/125 knows the origin of the transmission.

An example of a typical XFERB command is illustrated in FIG. 2 and is described in more detail below. An XFERB command under the RDI protocol comprises a sequence of fifteen (15) decimal (0–9) numbers divided into command "fields," with each field in the sequence having a predetermined "role" in the command. The XFERB command follows the structure "mc00tgggggnnnnn" where "m" refers to the "mode" field; "c" refers to the "ACK2" field (a request that the receiver respond with a positive acknowledgment upon receipt of the data); "00" (reserved placeholders); "t" refers to the "call type" field; "g" refers to one of the five numbers of the LID or GID field; and "n" refers to one of the four numbers in the "data binary bytes" field (indicating the size of the data block to be sent). Thus, in the example XFERB command of FIG. 2, the mode field 202 is "Standard XFERB" (1); the ACK2 field 204 is "Standard Sequence Implemented" (0); the placeholders (00) are in field 206; the call type field 208 is "Individual Call" (2); the LID field 210 is "16238"; and the data binary bytes field 212 are "0032". The complete sequence is thus 10002162380032.

Because each radio has a unique LID number, it is possible to address any individual radio from the dispatch center or from another radio unit that has the authority to do so. In the standard configuration, EDACS allows 16384 ($2^{14}$) individual users (LID Nos. 0–16383) to be defined in the system. Since five decimal digits (ggggg) are allocated to the ID numbers, theoretically a maximum number of 100,000 individual users (LID Nos. 00000 to 99999) could be defined in an EDACS system, if the RDI protocol were modified to allow the user ID numbers to exceed 16383.

A problem exists if it is desired to configure a system to be able to define more than 100,000 users. The XFERB command message used by the RDI protocol identifies a fixed-length and format (five decimal digits) for ID numbers, and many systems are now in place throughout the world that utilize this protocol. While the RDI protocol could be modified so that more than five decimal digits are available to specify the LID destination address, there would not be compatibility between the current system and a more-than-five-decimal-digit system. For example, a system using the current protocol would register an error condition upon receipt of a LID segment of more than 5 digits in size.

Accordingly, there is a need for a method and system for designating more than 100,000 LID's without changing the structure of the command message containing the LID.

SUMMARY OF THE INVENTION

The present invention introduces a new protocol, called the Extended Addressing Digital Interface (EADI) protocol. The EADI protocol allows for the designation of over 1,000,000 individual users in an EDACS system using the existing five-digit portion of the XFERB command message utilized for specifying the LID destination address. This is accomplished by using hexadecimal characters in the XFERB command message rather than decimal characters, thereby creating an "extended addressing" (EA) capability. The largest five-digit hexadecimal number, FFFFF, corresponds to the decimal number 1,048,575, thereby realizing the ability to exceed one million users, without having to change the size (number of digits) in the XFERB command message. Backward compatibility is assured by adding new mode commands that identify a particular XFERB command message as being generated by EA compatible equipment.

BRIEF DESCRIPTION OF THE DRAWINGS

FIG. 2 is an example of a typical XFERB command message of the prior art;

FIG. 3 illustrates the structure of a command message in accordance with the present invention.

DETAILED DESCRIPTION OF THE INVENTION

Figure 1:
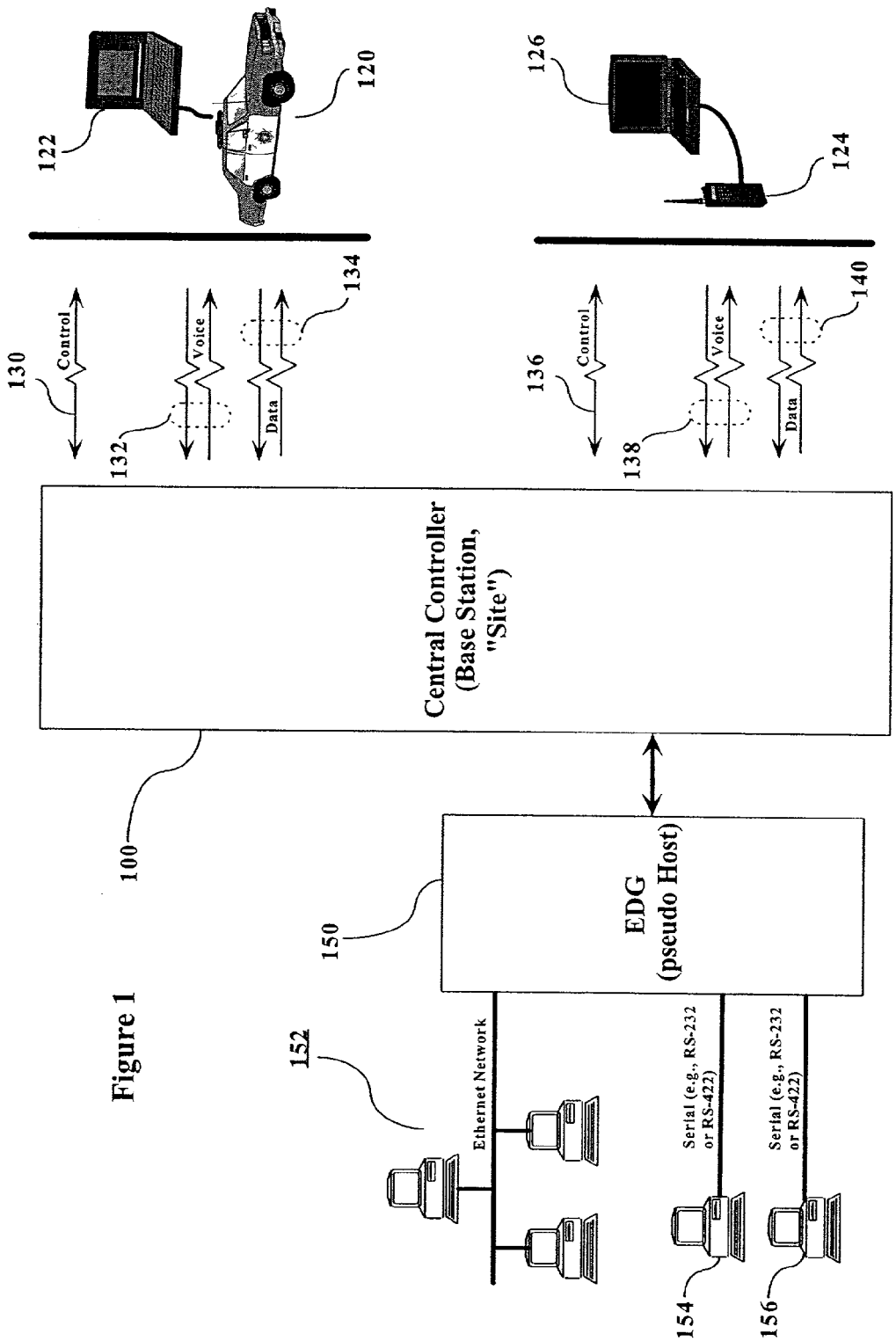
FIG. 1 illustrates a typical LMR environment of the prior art.

FIG. 3 illustrates an example of the structure of a command message in accordance with the present invention. Referring to FIG. 3, the XFERB command used in the EADI protocol of the present invention includes a "mode" field 302, "ACK2" field 304, placeholder field 306, "call type" field 308, "ID" field 310, and "data binary bytes" field 312, similar to the command message of an RDI protocol XFERB command illustrated in FIG. 2. However, in accordance with the present invention, hexadecimal numbers are used in the ID command field ("ggggg") of the command message. Use of hexadecimal characters in the ID field is referred to herein as "extended addressing" and when used with an MR, provides the MR with what is referred to herein as "EA capability." For example, in the example of FIG. 3, the five-digit hexadecimal number F112A corresponds to the six-digit decimal number 987434. By using hexadecimal numbering in the existing 5-digit ID field of the command message, up to 1,048,575 (hexadecimal FFFFF) ID's are available for use in a command message, without changing the number of digits in the ID field.

If both the MR and MDT have EA capability, when an XFERB command message using extended addressing is sent/received across the EADI interface, the system functions normally since both the sending device and the receiving device are compatible with the new addressing scheme. However, a problem could arise if, for example, an EA capable MR attempts to send an XFERB command message using extended addressing to a non-EA capable MDT. The incompatible MDT would receive the hexidecimal address and return an error message, and the two devices could not communicate with each other. Upgrading equipment on an incremental basis (e.g., purchasing dual-mode MDT's capable of operating in either EA or Non-EA modes at the beginning or end of a fiscal year and not upgrading the MR's until a later date) is a common mode of operation and thus such incompatibility is likely.

To solve this potential problem and ensure compatibility between systems using the standard addressing and systems having EA capability, in accordance with the present invention, two new values for the "mode" field of the XFERB command are utilized. As can be seen in the legend portion of FIG. 3, the mode field includes "Mode 1" and "Mode 2" as used by the prior art. In addition, in accordance with the present invention, a "Mode 3" for "standard extended address (EA) XFERB" and "Mode 4" for "profile EA message" are provided. These modes allow the receiver of the XFERB command to tell how to interpret the LID/GID field of the XFERB command, that is, either as decimal or hexadecimal coded digits.

As an example, assume a typical EDACS system that includes an MR/MDT pair, neither of which are EA compatible. Since both the MR and MDT are non-EA compatible, any XFERB commands sent between the two will only utilize Mode 1 or Mode 2 in the mode field, and everything will operate normally.

Now assume that as part of an initial upgrade, the operator of the system switches the MDT's in the system to dual-mode MDT's, meaning that they can operate in either EA or non-EA mode. When the dual-mode MDT attempts to send an XFERB command across the EADI to its associated non-EA capable MR using Mode 3 or Mode 4 in the mode field, the MR will send an error code back to the MDT (e.g., an ACK-A with the error code "DATERR_BAD_CALLTYPE") indicating that the MR is not EA compatible. This will cause the dual-mode MDT to switch to the non-EA mode and send the XFERB command message with the appropriate non-EA mode field ("Mode 1" or "Mode 2"). Thus, the system is backward compatible allowing users to upgrade on an "as-you-go" basis instead of requiring the entire upgrade to be performed at one time.

When the system operator takes the next step and upgrades the MR's to dual mode (i.e., EA compatible) equipment, when the new MR attempts to send its first message in the EA mode (i.e., using Mode 3 or Mode 4 in the mode field), the dual-mode MDT, at that point operating in non-EA mode, automatically switches to EA mode and receives the XFERB command properly. It is understood that the same action will occur (but in reverse) if the MR's are upgraded first, instead of the MDT's being upgraded first.

Figure 4:
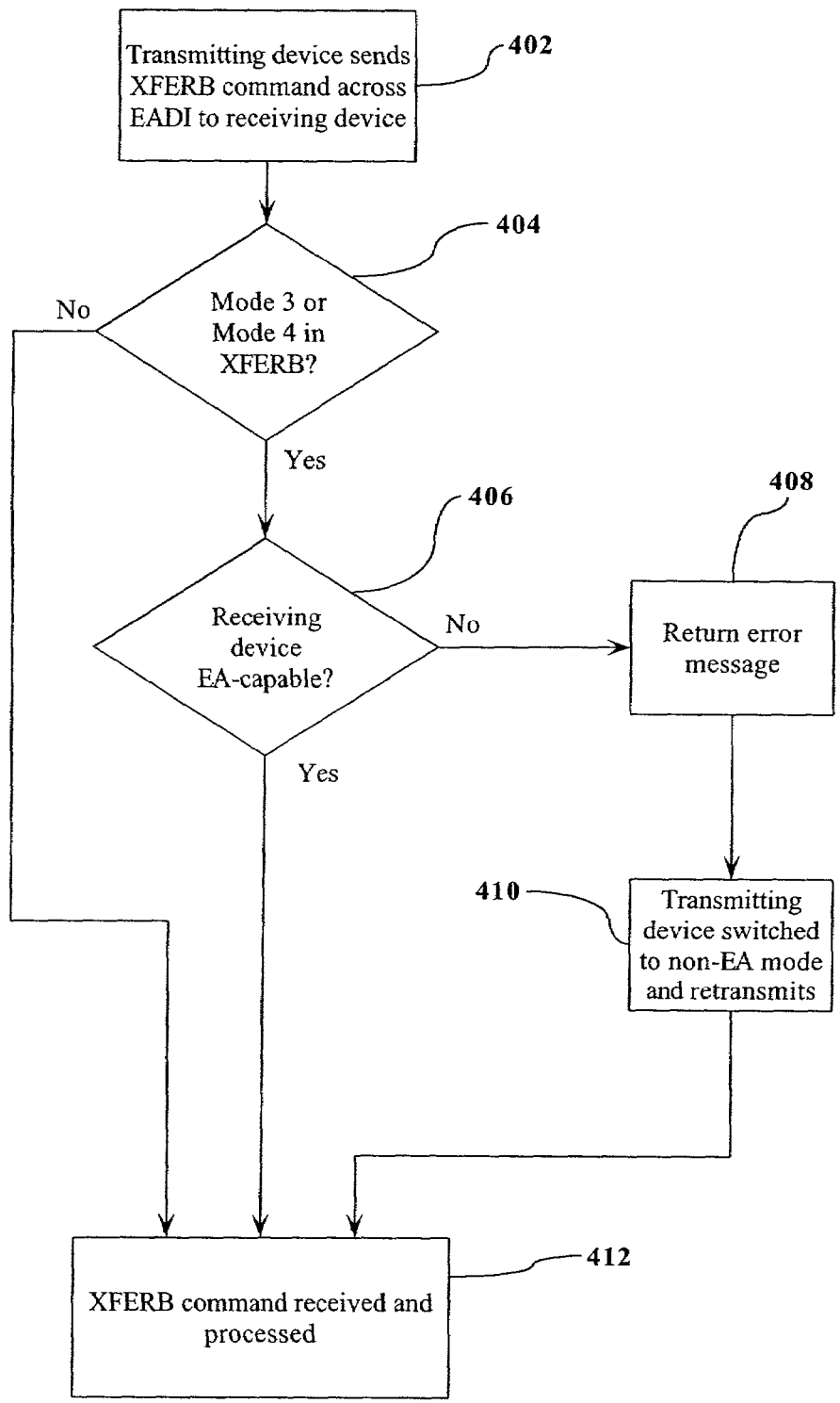
FIG. 4 is a flowchart illustrating an example of the basic steps performed during operation of a system in accordance with the present invention.

FIG. 4 is a flowchart illustrating an example of the basic steps performed during operation of a system in accordance with the present invention. At step 402, a transmitting device (e.g., an MDT or MR) sends an XFERB command across the EADI to its associated receiving device (MDT or MR). At step 404, a determination is made as to whether or not the XFERB command contains a Mode 3 or Mode 4 in the Mode field. If not, the XFERB command is known to be in non-EA format. Thus, since both non-EA-compatible and EA-compatible devices can process an XFERB command in non-EA-format, the process proceeds directly to step 412 where the XFERB command is received and processed.

If at step 404, a determination is made that the XFERB command does include a Mode 3 or Mode 4 in the Mode field, then at step 406, a determination is made as to whether or not the receiving device is EA-capable. If the receiving device is EA-capable, then the process proceeds to step 412 where the XFERB command is received and processed. If, however, a determination is made at step 406 that the receiving device is not EA-capable, then at step 408 an error message is returned to the transmitting device, and at step 410, the transmitting device switches to non-EA mode and retransmits the XFERB command in non-EA mode. At step 412, the XFERB command is received and processed.

Use of the present invention allows the expansion of the number of addresses that can be utilized in LMR's while ensuring backward compatibility with systems and hardware that are not yet EA compatible. The overall structure of the XFERB command remains the same while the capabilities that can be achieved are increased substantially.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located, for example, in central controller 100. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It should be understood that the foregoing is illustrative and not limiting and that obvious modifications may be made by those skilled in the art without departing from the spirit of the invention. For example, while the above-described embodiment is described in connection with an EDACS system, it is understood that the present invention will find application in any system in which a limited number of decimal digits are available as command characters in a command string, regardless of the type of system. Using hexadecimal characters instead of decimal characters, and designating additional control codes to designate the use of extended addressing, can find applicability in many other systems, communications systems or otherwise, and thus such uses fall within the scope of the claimed invention. Accordingly, the specification is intended to cover such alternatives, modifications, and equivalence as may be included within the spirit and scope of the invention as defined in the following claims.

What is claimed is:

1. A method for managing the flow of information between a first transmitting/receiving (TR) device and a second TR device in a radio system comprising a plurality of TR devices, comprising the steps of:

transmitting a send request, using the Extended Addressing Digital Interface (EADI) protocol, from said first TR device to said second TR device, said send request including logical ID (LID) information, in hexadecimal format, corresponding to at least one of said plurality of TR devices involved in the transmission;

receiving said send request at said second TR device; and identifying, at said second TR device, the identity of at least one of said plurality of TR devices involved in the transmission based on said LID information.

2. A method as set forth in claim 1, wherein said first TR device comprises a mobile data terminal (MDT) and said second TR device comprises a mobile radio (MR).

3. A method as set forth in claim 1, wherein said at least one of said plurality of TR devices identified in said identifying step comprises said first TR device.

4. A method as set forth in claim 1, wherein said at least one of said plurality of TR devices identified in said identifying step comprises a third TR device.

5. A method as set forth in claim 1, wherein said send request transmitted during said transmitting step further includes information identifying the compatibility level of said first TR device.

6. A method as set forth in claim 5, wherein said radio system comprises an EDACS system, and wherein at least one of said plurality of TR devices comprises and EA-compatible device.

7. A method as set forth in claim 6, wherein said compatibility level identifying information comprises at least one mode field identifying the transmission as originating from an EA-compatible TR device.

8. A method as set forth in claim 7, wherein said send request comprises an XFERB command.

9. A land mobile radio (LMR) system, comprising:
a plurality of mobile radio (MR) devices, each having a logical ID (LID);
a plurality of mobile data terminals (MDT's), each coupled to a different one of said plurality of MR devices, thereby forming a plurality of MR/MDT pairs; and
an interface between each MR/MDT pair, said interface including a processor configured to pass instructions between each MR/MDT pair in the form of software code containing a send request using the Extended Addressing Digital Interface (EADI) protocol, said send request including information in hexidecimal format identifying a logical identifier (LID) of one of said plurality of MR devices in said LMR system.

10. A system as set forth in claim 9, wherein said LID information identifies a target MR.

11. A system as set forth in claim 9, wherein said LID information identifies a transmitting MR.

12. A system as set forth in claim 9, wherein said send request further includes information identifying a compatibility level of said one of said plurality of MR devices identified by said LID information.

13. A system as set forth in claim 12, wherein said LMR system comprises an EDACS system.

14. A system as set forth in claim 13, wherein said compatibility level information identifies said one of said plurality of MR devices as being an EA-compatible device.

* * * * *